July 30, 1957 W. K. SQUIRES 2,801,365

VERTICAL DEFLECTION SYSTEM FOR TELEVISION RECEIVERS

Filed Sept. 17, 1954

INVENTOR.
William K. Squires
BY
Mason, Kolehmainen, Rathburn & Wyss
Attys 2,801,365
Patented July 30, 1957

2,801,365

VERTICAL DEFLECTION SYSTEM FOR TELEVISION RECEIVERS

William K. Squires, Snyder, N. Y., assignor to Sylvania Electric Products, Inc., a corporation of Massachusetts Application September 17, 1954, Serial No. 456,744
4 Claims. (Cl. 315—27)

Figures 1, 2, 3, 4, 5, 6:
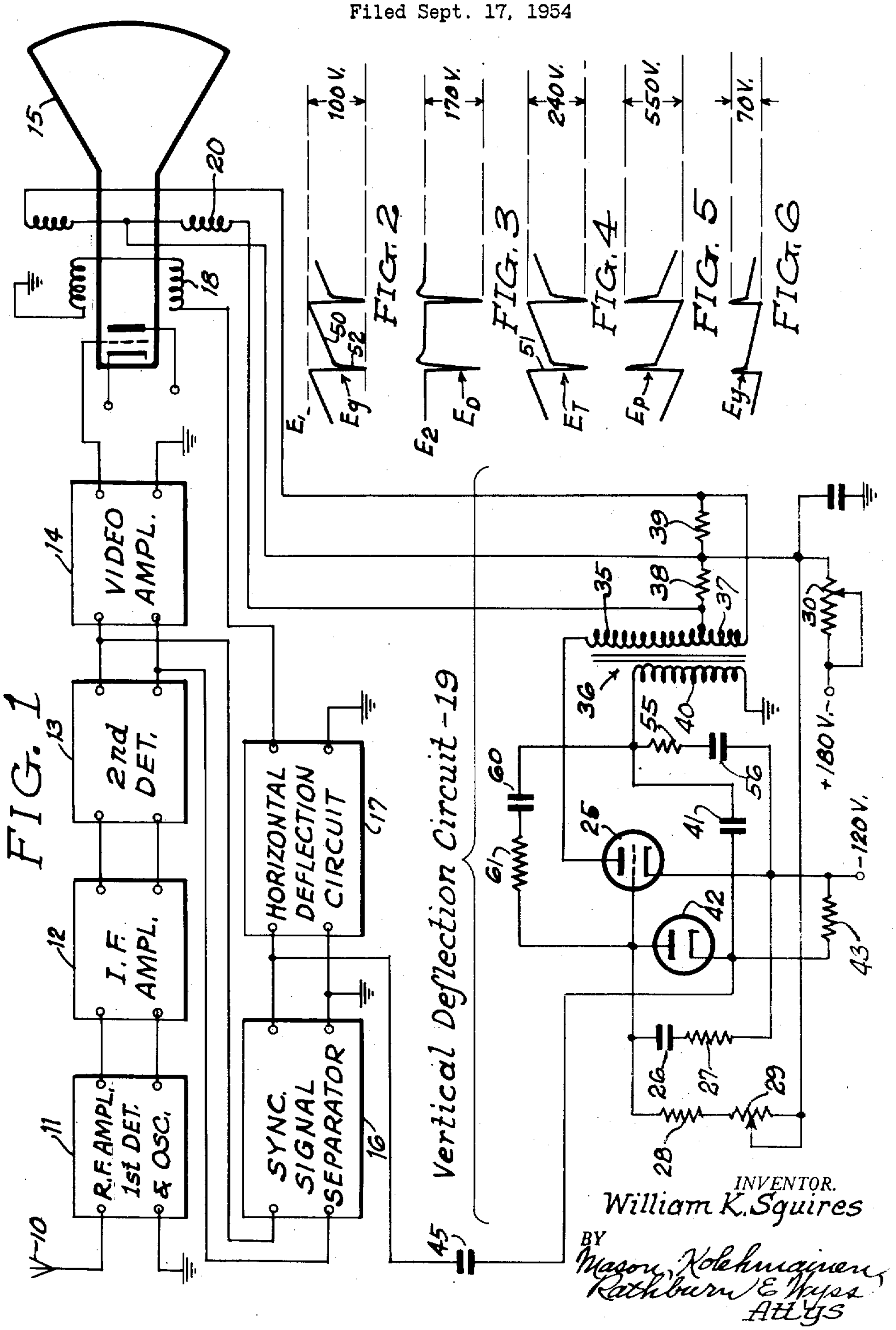

The present invention relates to television receivers, more particularly to a vertical deflection system for television receivers, and the invention has for an object the provision of a simplified vertical deflection system requiring only a single tube which functions as a combined vertical oscillator and deflection output tube to drive the vertical deflection coils in the receiver directly from the vertical synchronizing pulses of the received television signal.

While many arrangements have been heretofore proposed for deflecting the electron beam of a television picture tube in the vertical direction, most, if not all, of these arrangements have required two electron tubes one of which is operated as an oscillator to develop a suitable sawtooth scanning voltage and the other of which is operated as a power output tube to develop a scanning waveform of sufficient power to drive the vertical deflection coils which surround the neck of the picture tube. While these arrangements have in general been satisfactory for their intended purpose, it would be desirable from the standpoint of efficiency, economy and physical space involved to provide a vertical deflection circuit wherein a single tube may be employed to accomplish the above described functions.

Under present television standards an interlaced system of vertical scanning is employed wherein first the odd numbered horizontal lines are scanned and then the even numbered horizontal lines are scanned. In order to provide a picture of good quality this vertical interlace of successive vertical scanning periods must be preserved even though the received television signal is relatively weak. However, in most deflection coil systems in use today the horizontal and vertical deflection coils are positioned relatively close together with the result that interaction or so-called cross talk between the horizontal and vertical deflection coils occurs and a horizontal deflection waveform may be coupled back into the vertical deflection circuit in such a manner as to destroy vertical interlace. Such a condition is particularly apparent when a triode output tube is employed in the vertical deflection circuit due to the relatively large plate to grid capacity of such a tube which permits a relatively large cross talk signal to appear at the grid of the output tube and affect vertical interlace.

It is, therefore, another object of the present invention to provide a new and improved vertical deflection circuit for a television receiver which requires only a single tube and includes facilities for preventing cross talk from the horizontal deflection circuit of the receiver from affecting the interlace of successive vertical scanning periods.

Briefly, in accordance with one phase of the invention, a combined vertical oscillator and deflection output tube is provided and an output transformer is employed to couple the anode of said tube to the vertical deflection coils. A condenser charging circuit is provided in the grid circuit of said tube so that a positively increasing voltage is applied to the control grid during the vertical scanning periods to cause a corresponding linear increase in the plate current thereof. The output transformer is provided with an auxiliary winding which is connected to the cathode of a diode rectifier the anode of which is connected to the charging condenser and vertical synchronizing pulses, which have been separated from the composite television signal, are applied to either the control grid or the cathode circuit of the tube to initiate the vertical retrace periods. When the diode is initially rendered conductive by the vertical synchronizing pulses the rate of change of anode current decreases with the result that a negative voltage is developed across the auxiliary winding of the output transformer which is applied to the diode in the correct polarity to cause the abrupt discharge of the charging condenser through the diode with the result that the tube is driven beyond the anode current cut-off point thereof. In order to prevent cross talk between the horizontal and vertical scanning coils from destroying the vertical interlace of successive vertical scanning periods, the voltage developed across the auxiliary winding of the output transformer is also coupled to the control grid of the combined vertical oscillator and deflection output tube so as to cancel the plate to grid feedback which occurs within this tube. Also in accordance with a further phase of the invention, a loading circuit is provided across the auxiliary winding of the output transformer to prevent ringing transients from being developed across this winding during the vertical retrace intervals.

The invention, both as to its organization and method of operation, together with further objects and advantages thereof, will best be understood by reference to the following specification taken in connection with the accompanying drawings, in which:

Fig. 1 is a schematic diagram, partly in block diagram form, of a television receiver embodying the principles of the present invention; and Figs. 2 to 6, inclusive, are graphs of various waveforms developed in the circuit of Fig. 1.

Referring now to Fig. 1 of the drawings, the system illustrated therein comprises a modulated carrier wave television receiver of the superheterodyne type including an antenna system 10 connected to an R. F. amplifier first detector and oscillator 11, to which are connected in cascade relation in the order named an intermediate frequency amplifier 12, a second detector 13, a video amplifier 14 and a cathode ray tube viewing device 15. A synchronizing signal separation circuit 16 is connected to the output of the second detector 13 and supplies separated horizontal synchronizing pulses to a horizontal deflection circuit 17 so as to develop a suitable horizontal scanning waveform in the horizontal deflection coils 18 which surround the neck of the cathode ray tube 15. The vertical synchronizing pulses, which are separated from the composite television signal by the separator circuit 16, are supplied to the vertical deflection circuit 19, which functions in accordance with the principles of the present invention to supply a vertical scanning waveform to the vertical deflection coils 20 which surround the neck of the cathode ray tube 15.

The units 10 to 18, inclusive, and 20 may all be of conventional well-known construction so that a detailed description thereof is considered unnecessary herein. However, referring briefly to the operation of the above described system as a whole, television signals intercepted by the antenna circuit 10 are applied to the unit 11 wherein they are converted into intermediate frequency signals which are selectively amplified in the amplifier 12 and are detected in the second detector 13. The modulation components of the received signal which are detected in the second detector 13 are supplied to the video amplifier 14 wherein they are amplified and impressed upon the control grid of the cathode ray tube 15, the cathode of this tube being suitably biased for correct background level of the reproduced image. The composite video signal developed in the output of the second detector 13 is also supplied to the signal separator circuit 16 wherein the horizontal synchronizing signals are separated from the vertical synchronizing signals and the picture components of the composite video signal, the separated horizontal synchronizing pulses being employed to control the horizontal deflection circuit 17 in a conventional manner.

Considering now in more detail the manner in which the vertical deflection circuit 17 functions to develop a suitable scanning waveform in the vertical deflection coils 20, the circuit 19 includes a combined vertical oscillator and deflection output tube 25, the tube 25 being of the triode type and preferably comprising one triode section of a double triode of the commercial type 7AF7. A charging condenser 26 is connected to the control grid of the tube 25 and through the resistor 27 to the cathode of this tube. The condenser 26 is also connected through the resistor 28 and the potentiometers 29 and 30 in series to a positive source of unidirectional potential of the order of plus 180 volts, the cathode of the tube 25 being connected to a negative source of unidirectional potential of the order of minus 120 volts. The anode of the tube 25 is connected to a winding 35 of an output transformer 36 which is of the autotransformer type insofar as the vertical deflection coils are concerned, the vertical deflection coils 20 being connected across a portion 37 of the winding 35 which is chosen for optimum efficiency in driving the coils 20 from the tube 25. Anode potential for the tube 25 is derived from the plus 180 volt supply through the potentiometer 30 and the resistors 38 and 39 which are connected across the vertical deflection coils 20 so as to provide equal and opposite D. C. currents through these coils. The transformer 36 is provided with an auxiliary winding 40, one end of which is connected to ground and the other end of which is coupled through a condenser 41 to the cathode of a diode rectifier 42, the anode of which is connected to the control grid of the tube 25 and the condenser 26. The rectifier 42 preferably comprises one-half of a double diode tube of the commercial type 6AL5. However, it will be understood that the tubes 25 and 42 may equally well be contained in the same envelope or one triode of a double triode tube connected to act as the diode 42, as will be readily understood by those skilled in the art. The cathode of the diode 42 is also connected through the resistor 43 to the cathode of the tube 25. Negative vertical synchronizing pulses, which are separated from the other components of the composite television signal in the separation circuit 16, are coupled through the condenser 45 to the cathode of the diode 42 so as to initiate conduction of the diode 42 at the start of each vertical synchronizing pulse.

Considering now the operation of the vertical deflection circuit 19 in developing a vertical scanning waveform which is synchronized with the received vertical synchronizing pulses, the condenser 26 is charged positively from the supply potentials through the potentiometers 30 and 29 and the resistors 28 and 27 so that the control grid voltage of the tube 25 increases positively at a substantially linear rate and the anode current of the tube 25 increases linearly during the vertical trace interval. Thus, referring to Fig. 2 of the drawing, as the condenser 26 is charged the voltage $E_g$ applied to the control grid of the tube 25 is increased positively as indicated by the positively increasing portion 50 of the wave form $E_g$ shown in Fig. 2. However, when the voltage across the condenser 26 reaches the value $E_1$ shown in Fig. 2, the diode 42 starts to conduct with the result that the rate of change of grid voltage is decreased. When the rate of change of grid voltage $E_g$ decreases, the rate of change of plate current in the tube 25 decreases correspondingly with the result that the plate voltage $E_P$ shown in Fig. 5 of the drawings increases abruptly. The voltage $E_T$ (Fig. 4), developed across the auxiliary winding 40 of the transformer 36, is of the opposite polarity from the voltage $E_P$ so that a negative going voltage 51 (Fig. 4) is developed across the auxiliary winding 40 as soon as the diode 42 starts to conduct. The voltage $E_T$ appearing across the winding 40 is differentiated in the network including condenser 41 and the resistor 43 so that a voltage $E_D$ (Fig. 3) is produced and is impressed upon the cathode of the diode 42. The negative going voltage $E_D$ which is applied to the cathode of the diode 42 causes this diode to conduct still more heavily with the result that the condenser 26 is discharged abruptly through the diode 42 as shown by the negative going pulse portion 52 of the wave form $E_g$ of Fig. 2. The voltage $E_D$ impressed upon the cathode of the diode 42 returns to its normal value $E_2$ (Fig. 3) as soon as the rate of change of plate current of the tube 25 becomes constant so that the diode 42 is rendered non-conductive and the condenser 26 again charges positively to produce the next scanning period. Accordingly, a suitable scanning waveform $E_Y$ (Fig. 6) is impressed upon the vertical scanning coils 20 so as to deflect the electron beam of the cathode ray tube 15 in the desired manner. The negative vertical synchronizing pulses, which are coupled through the condenser 45 to the cathode of the diode 42 control the instant in time at which the diode 42 starts to conduct and hence maintain the vertical deflection waveform $E_Y$ in synchronism with the received television signal. In this connection, it will be understood that if the vertical synchronizing pulses developed by the separator 16 are of positive polarity they may be employed to control the vertical deflection circuit 19 by impressing the same across the resistor 27, the positive synchronizing pulses being coupled through the condenser 26 to the anode of the diode 42 to initiate conduction thereof. With either polarity of synchronizing pulse, as soon as the diode 42 starts to conduct the above described vertical deflection cycle is initiated. The frequency of the vertical deflection wave $E_Y$ may be adjusted by means of the potentiometer 29, which controls the rate at which the condenser 26 is charged, so that synchronism with the vertical synchronizing pulses is held despite line voltage variations and the like. The amplitude of the wave $E_Y$, and hence the vertical size of the picture, may be adjusted by means of the potentiometer 30 which controls the supply voltage available for both the condenser 26 and the anode of the tube 25.

During the vertical retrace intervals the tube 25 is cut off by the negative pulse portion 52 of the grid voltage $E_g$ so that the loading effect of the tube 25 on the transformer 36 is removed. In order to prevent ringing transients from being developed in the winding 40 during vertical retrace periods, i. e., during periods when the condenser 26 is discharged through the diode 42, a damping network including the resistor 55 and the condenser 56 is connected between the upper end of the auxiliary winding 40 and the cathode of the tube 25. During the vertical scanning periods the network 55, 56 has relatively little loading effect since the fundamental frequency of the vertical scanning cycle is 60 cycles per second at which frequency the network 55, 56 has a relatively high impedance. However, during the vertical retrace intervals much higher frequencies are involved due to the sharp negative pulse 52 of the grid voltage $E_g$ and at these higher frequencies the network 55, 56 produces a substantially damping effect upon the auxiliary winding 40 so that oscillatory transients are not produced in the transformer 36 during the vertical retrace periods.

The horizontal deflection coils 18 are normally positioned closely adjacent to the vertical deflection coils 20 so that a certain percentage of the horizontal deflection signal developed in the coils 18 is inductively coupled to the vertical deflection coils 20. Furthermore, the horizontal deflection signal coupled to the coils 20, which may be called a horizontal cross talk voltage, is stepped up in amplitude due to the autotransformer winding 35 so that a relatively large cross talk voltage is impressed upon the anode of the tube 25 and is coupled to the control grid of this tube through the plate-to-grid capacity thereof. Since this cross talk voltage occurs at the horizontal scanning rate of 15,750 cycles and includes a sharp pulse at the beginning of each horizontal trace, it will tend to destroy the interlace between successive vertical deflection cycles. This is because the cross talk voltage will tend to initiate each vertical deflection cycle at the start of a horizontal deflection cycle whereas with interlaced vertical scanning every other vertical deflection cycle is initiated in the middle of a horizontal deflection cycle to obtain the desired interlace of odd and even horizontal lines.

In order to prevent the horizontal cross talk voltage from destroying the vertical interlace pattern, the auxiliary winding 40 is employed as a source of feedback voltage of the correct polarity to cancel the cross talk voltage coupled to the control grid of the tube 25 in the manner described above. More particularly, a network including the series connected condenser 60 and resistor 61 is connected between the upper end of the winding 40 and the control grid of the tube 25. Since the auxiliary winding 40 is inductively coupled to the transformer winding 35, the horizontal cross talk voltage developed across the coils 20 also appears across the windlng 40 but with the opposite polarity from the cross talk voltage impressed upon the anode of the tube 25. The capacity of the condenser 60 and the resistance of the resistor 61 are so chosen that the correct amount of horizontal cross talk voltage is coupled to the control grid of the tube 25 through the network 60, 61 to exactly cancel the horizontal cross talk voltage of the opposite polarity coupled to this control grid through the plate-to-grid capacity of the tube 25. Accordingly, the horizontal cross talk voltage does not appear at the control grid of the tube 25 and vertical interlace is preserved even though a substantial amount of cross talk between the coils 18 and 20 occurs.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In a television receiver, a source of vertical deflection synchronizing pulses, a combined vertical oscillator and deflection output tube, a condenser connected to the control grid of said tube, means for charging said condenser positively at a substantially linear rate, a vertical scanning yoke, an output transformer having an auxiliary winding, means including said output transformer for coupling the anode of said tube to said scanning yoke, a diode having an anode connected to said condenser, means for differentiating the voltage appearing across said auxiliary winding and impressing said differentiated voltage on the cathode of said diode, thereby to discharge said condenser through said diode, and means for impressing synchronizing pulses from said source on said diode.

2. In a television receiver, a source of vertical deflection synchronizing pulses, a combined vertical oscillator and deflection output tube, a condenser connected to the control grid of said tube, means for charging said condenser positively at a substantially linear rate, a vertical scanning yoke, an output transformer having an auxiliary winding, means including said ouptut transformer for coupling the anode of said tube to said scanning yoke, a diode having an anode connected to said condenser, means including a differentiation network for connecting said auxiliary winding to the cathode of said diode, and means for impressing said synchronizing pulses on said differentiation network to control initial conduction of said diode.

3. In a television receiver, a source of vertical deflection synchronizing pulses, a combined vertical oscillator and deflection output tube, a condenser connected to the control grid of said tube, means for charging said condenser positively at a substantially linear rate, a vertical scanning yoke, an output transformer having an auxiliary winding, means including said output transformer for coupling the anodes of said tube to said scanning yoke, a diode connected to said condenser, means including a first feedback network connected between said auxiliary winding and said diode for discharging said condenser through said diode, means for impressing said synchronizing pulses on said diode to control initial conduction thereof, and means including a second feedback network connected between said auxiliary winding and the control grid of said tube for cancelling internal feedback between the anode and control grid of said tube, whereby interlace during successive vertical scanning periods is preserved in the presence of an undesired voltage at the anode of said tube.

4. In a television receiver, a source of vertical deflection synchronizing pulses, a combined vertical oscillator and deflection output tube, a condenser connected to the control grid of said tube, means for charging said condenser positively at a substantially linear rate, a vertical scanning yoke, an output transformer having an auxiliary winding, means including said output transformer for coupling the anode of said tube to said scanning yoke, a diode having an anode connected to said condenser, means for connecting said auxiliary winding to the cathode of said diode to discharge said condenser through said diode upon a decrease in the rate of change of anode current of said tube, means for impressing said synchronizing pulses on said diode to control initial conduction thereof, and means independent of said diode for connecting said auxiliary winding to the control grid of said tube, thereby to cancel internal feedback between the anode and control grid of said tube and preserve interlace during successive vertical scanning periods.

References Cited in the file of this patent

UNITED STATES PATENTS

| | | |
|---|---|---|
| 2,336,837 | Bedford | Dec. 14, 1943 |
| 2,574,365 | Wynn | Nov. 6, 1951 |